Sept. 1, 1959  J. F. SWIFT  2,901,888
MULTI-PISTON SERVO-MOTOR
Filed Sept. 20, 1957  4 Sheets-Sheet 1

Inventor:
John F. Swift
Paul O. Pippel
Atty.

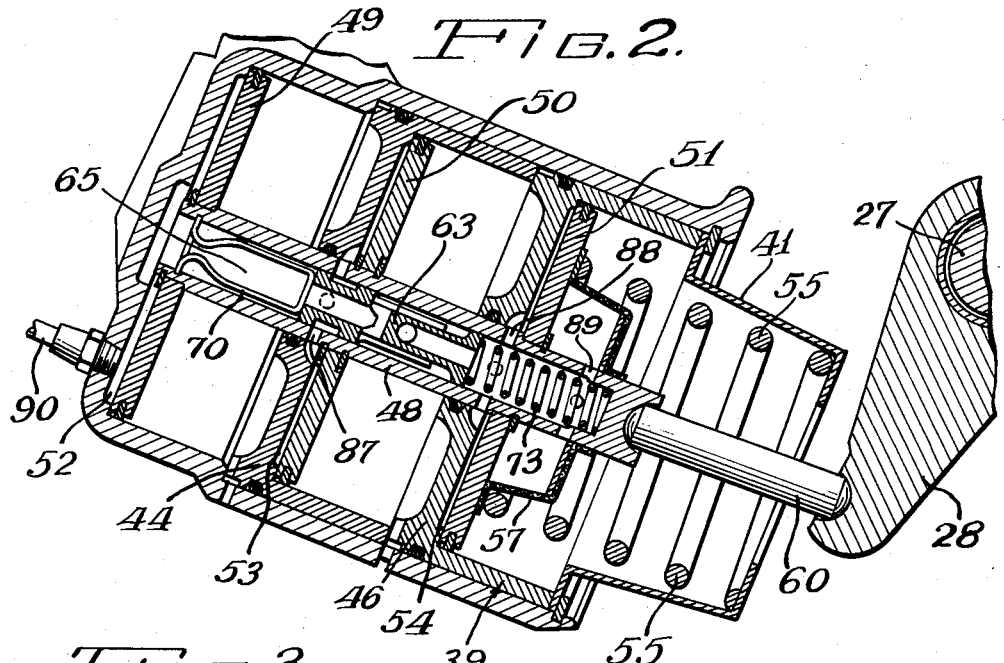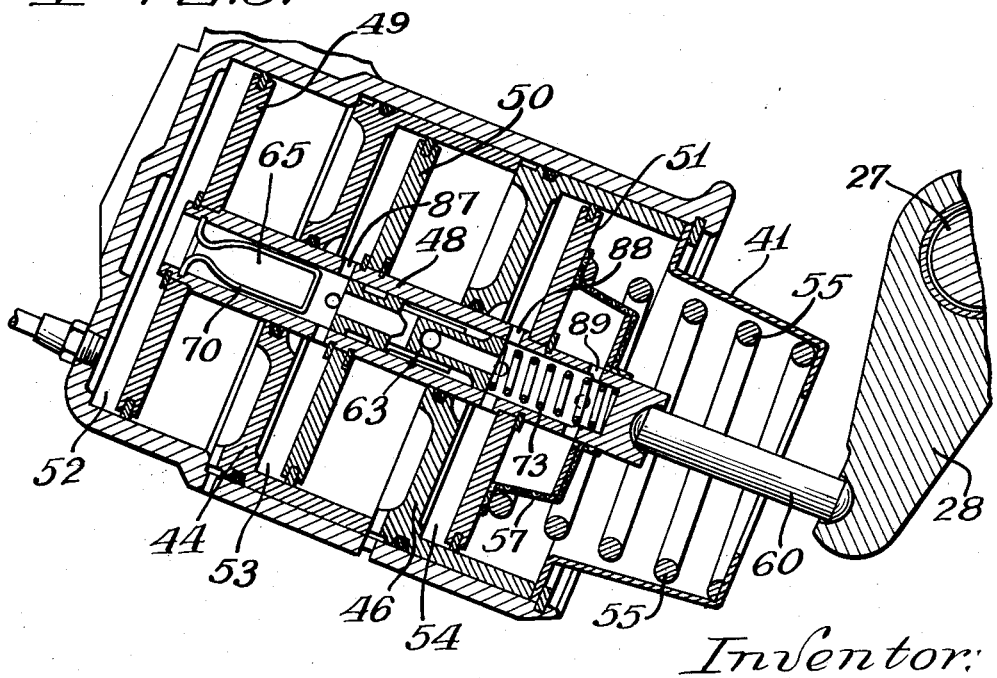

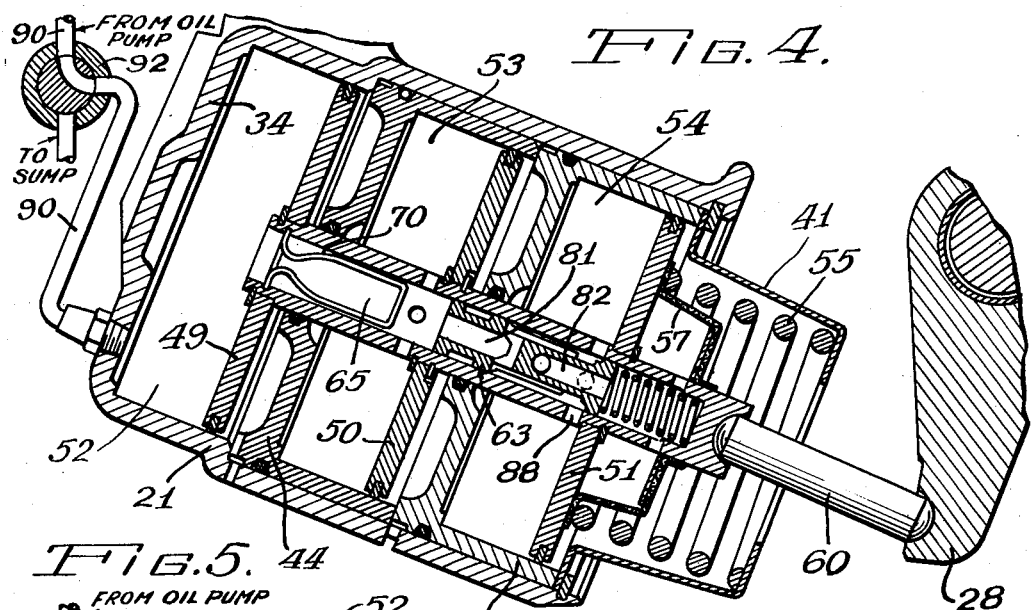
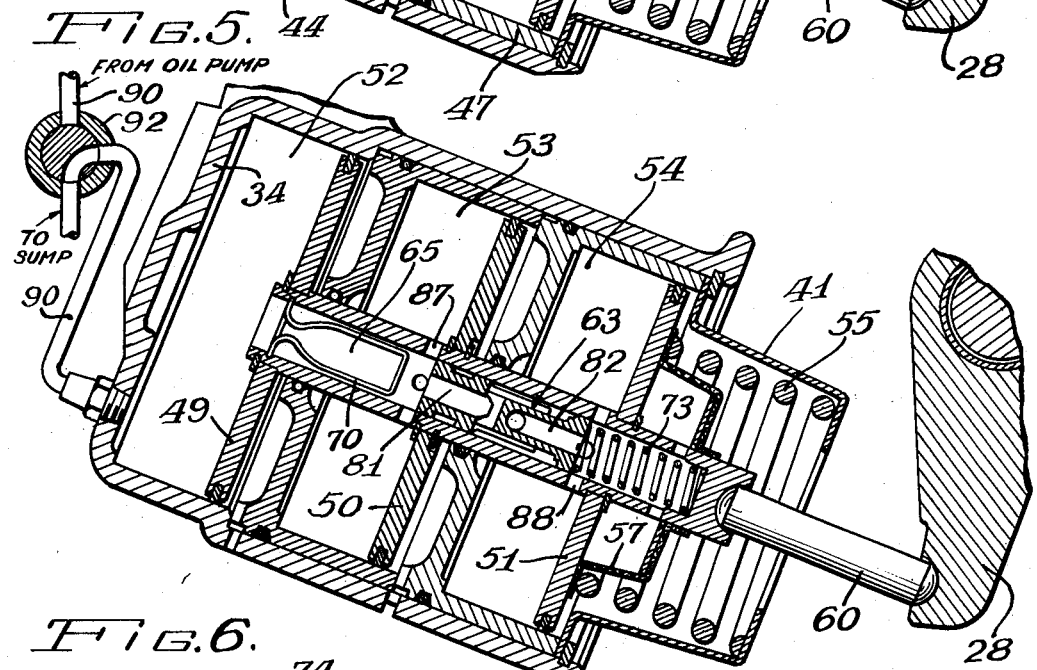
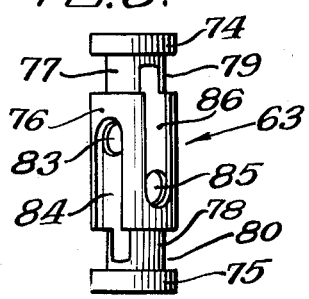

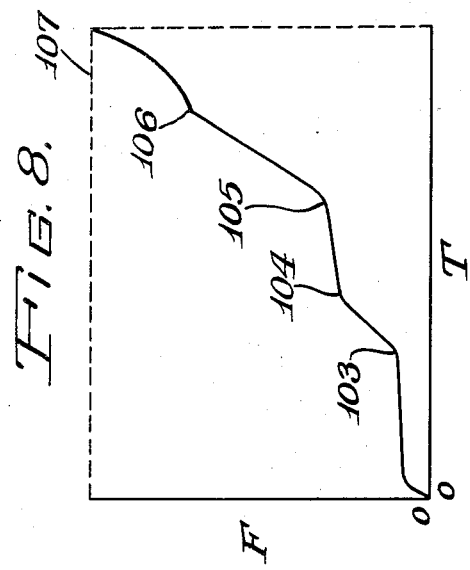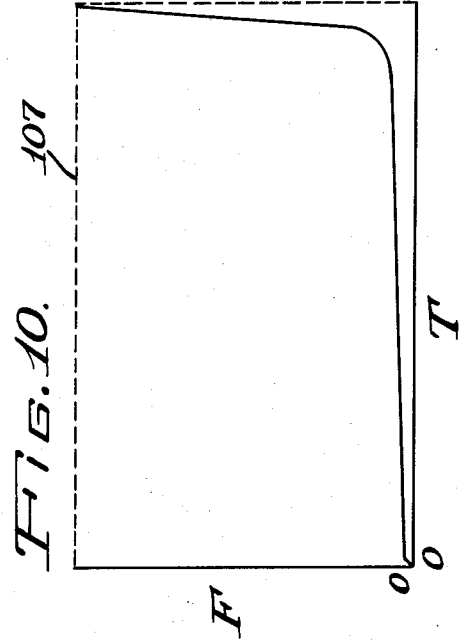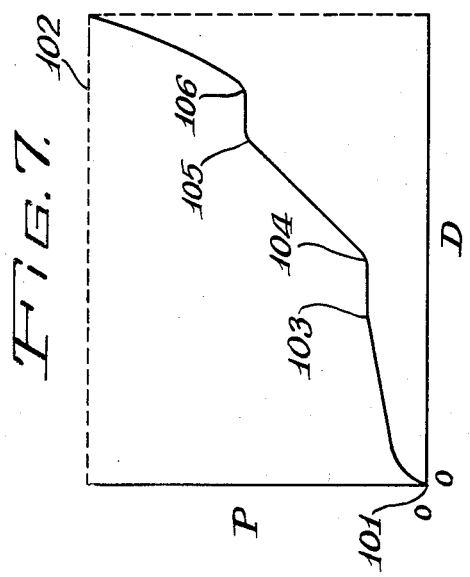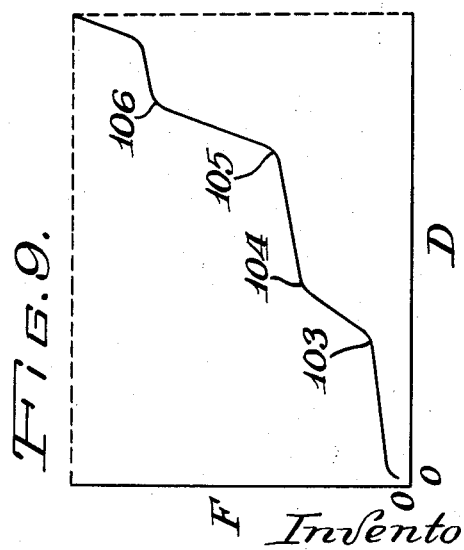

United States Patent Office 2,901,888
Patented Sept. 1, 1959

2,901,888

MULTI-PISTON SERVO-MOTOR

John F. Swift, Fort Wayne, Ind., assignor to International Harvester Company, Chicago, Ill., a corporation of New Jersey Application September 20, 1957, Serial No. 685,316

7 Claims. (Cl. 60—97)

This invention relates to servo mechanisms and, more particularly, to a new and improved fluid pressure actuated device for operating brakes and clutches or the like.

In the operation of many hydraulically actuated devices such as previously mentioned it is necessary that frictionally engageable elements be moved a certain relative distance before they produce any effect. In the case of automatic transmissions of the type utilizing planetary gear sets wherein a hydraulically actuated brake mechanism may be employed for holding one of the elements of the planetary gear set to cause it to serve as a reaction member to effect a speed ratio change in the transmission, it is necessary that the brake element be moved to engage the brake drum, at which point the braking action of the brakes actually commences. The movement of the brake element from the fully released position to the position where the brake element initially engages the brake drum or other rotating part of the brake which is to be braked is generally termed "slack." The amount of power required to move the brake element into initial contact with the drum is relatively small even though such relative movement is large when compared with the total movement of the brake element from its fully released position to its fully engaged position. Thus for the first phase of operation the force delivered by the servo mechanism need not be great. During the second operational phase of the brake mechanism the brake element moves from the point where it initially engages the brake drum to a position wherein it fully engages the brake drum. The force delivered by the servo mechanism during the second operational phase must be greater than that required during the first phase of operation even though the movement of the brake element is considerably less than that encountered during the first operational phase. The third and last operational phase of the brake mechanism may be termed the brake holding phase and occurs after the second or brake-applying phase of operation has substantially ceased. In this third phase very little if any movement of the brake element with reference to the brake drum occurs. However, the force delivered by the servo mechanism must be sufficiently great to insure a positive holding of the brake element or brake drum. The third phase of operation obviously requires the application of the maximum force that the servo mechanism is capable of exerting. It will thus be appreciated that one of the major problems encountered in the design of brake and clutch mechanisms employed in automatic type transmissions is the provision of a servo mechanism capable of exerting a predetermined force applied in a particular manner in each of the three operational phases of the brake mechanism. The problem is particularly acute in motor vehicle power transmission units that utilize hydraulically operated servo mechanisms to provide means for controlling the transmission of different speed ratios through the power transmission unit. As an example, if the brake element is suddenly engaged with the brake drum in an uncontrolled manner as when the maximum force deliverable by the servo mechanism is applied during all three operational phases of the brake mechanism, a lurch may be produced and consequently undesirable rough operation of the transmission results. The problem of designing a servo mechanism for efficiently controlling the engagement of the brake mechanism is made further difficult when it is realized that the brake band and other elements of the brake mechanism become worn when used over a period of time and in order to compensate for the increased slack in the brake mechanism without decreasing the braking efficiency of the braking mechanism the force and the duration of application of the force exerted by the servo mechanism during the first operational phase must consequently vary without effecting the other two operational phases of the brake engagement cycle. It is, therefore, the primary objective of the present invention to provide a servo mechanism for effecting frictional engagement of clutch or brake members of a clutch or brake wherein the brake or clutch-applying force produced thereby is made in three stages and wherein the force is automatically converted from a low force initial stage (to initially move the engageable elements of the brake or clutch into contact with each other), to an intermediate brake or clutch-applying stage, and then to a high force stage for holding the brake or clutch in its applied condition.

A further object is the provision of a fluid actuated device for effecting engagement of the elements of a brake or clutch in which provision is made for providing a cushioned and control engagement of the brake or clutch elements despite wear thereof.

A further object is the provision of a fluid actuated device for brake or clutch mechanism capable of exerting sufficient but not excessive applying force to the mechanism for taking up slack prior to effecting braking or clutching engagement of the engageable elements of the mechanism.

A still further object is the provision of a servo-motor which is comparatively compact and has a relatively small fluid capacity and thus is particularly adaptable for motor vehicle transmissions.

Another object is the provision of a fluid pressure actuator comprising a compound piston which operates in a plurality of chambers or cylinders in conjunction with a control valve which allows for the delivery of force in three substantially distinct stages and wherein the increase in force between each stage is relatively small and consequently a sudden jump between the minimum force obtainable with the actuator to its maximum force is eliminated.

Still another object of the invention is the provision of a fluid pressure actuator used in conjunction with clutch or brake mechanisms for effecting frictional engagement of the elements thereof wherein the release of the brake or clutch mechanism is relatively rapid since two-thirds of the volume of fluid introduced into the actuator to apply the brake or clutch mechanism is drained directly to the fluid sump upon secession of fluid communication between the source of fluid pressure and the actuator.

The foregoing and other important objects and desirable features inherent in and encompassed by the invention, together with many of the purposes and uses thereof, will become readily apparent from a reading of the ensuing description in conjunction with the annexed drawings in which:

Figure 2 is a sectional view similar to Figure 1 showing the position the parts will assume when the brake mechanism is fully released;

Figure 3 is a sectional view illustrating the positions of the parts of the servo-motor when the servo-motor is in its second operational or brake-applying phase;

Figure 4 is a vertical sectional view of the servo-motor showing the position the parts will assume when the brake mechanism is in its fully brake-engaged position which corresponds to the third operational or brake-holding phase of the servo-motor;

Figure 5 is a vertical sectional view of the servo-motor showing the position of the parts during the releasing operation of the brake mechanism;

Figure 6 is a detailed side elevational view of the control valve;

Figure 7 is a chart wherein the pressure in one of the piston chambers is plotted against displacement of the piston rod;

Figure 8 is a chart illustrating the brake-applying force delivered by the servo-motor plotted against time;

Figure 9 is a chart wherein the brake-applying force delivered by the servo-motor is plotted against the displacement or working stroke of the piston rod; and Figure 10 is a chart similar to Figure 8 except that the force delivered by a conventional single piston servo-motor is plotted against the time for the brake applying operation.

Figure 1:
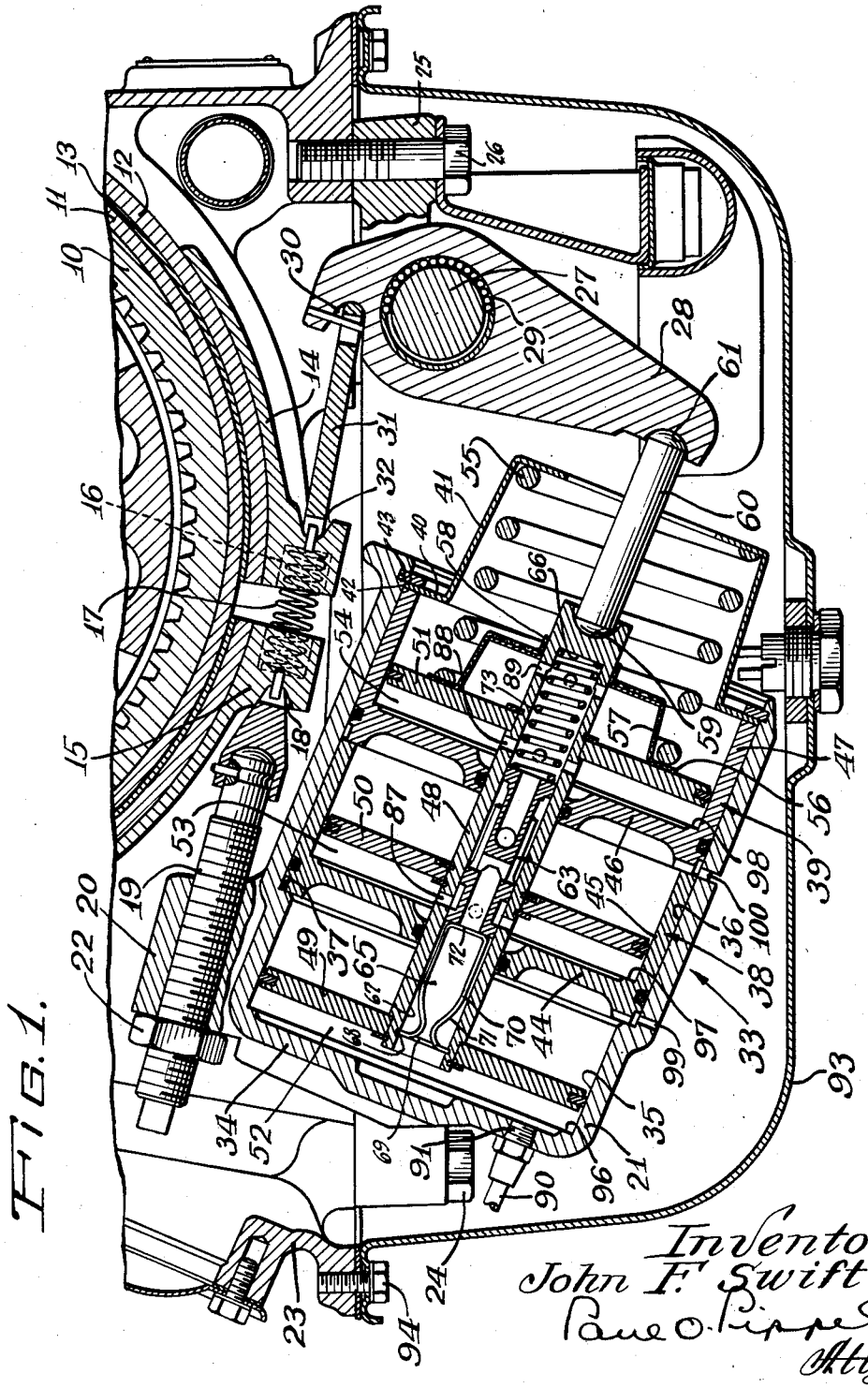
Figure 1 is a detailed sectional view of the servo-motor and a portion of a brake mechanism of the type used in motor vehicle transmissions; the components of the servo-mechanism being in the relative positions corresponding to the first operational or slack take-up phase of the mechanism.

Referring to the drawings in detail wherein like reference characters represent like elements throughout the various views, there is shown a portion of a ring gear 10 having an axially extending peripheral brake drum 11 that is adapted to be selectively engaged by a band-type brake element 12. The band-type brake element 12 preferably has its inner surface covered with a lining 13 of friction material that is normally spaced radially outwardly of the brake drum 11. When the brake band 12 firmly grips the brake drum 11 the ring gear 10 is held stationary and serves as a reaction member for a planetary gear set (not shown) to effect a speed ratio change through the power transmission unit employing the invention. It is to be understood that while the invention to be described hereinafter in detail is applied to a brake mechanism of a motor vehicle automatic transmission, the invention can also be applied to a band-type clutch or similar device operated by a servo mechanism and in other environments other than motor vehicle automatic transmissions. The brake band 12 substantially encircles the brake drum 11 and has an enlarged anchor lug 14 rigidly secured to the outer surface of one end thereof. The opposite end of the brake band 12 is provided with a similar enlarged anchor lug 15. The lugs 14 and 15 are provided with recesses 16 which serve as pockets for receiving a respective end of a helical wound compression spring 17, the purpose of which will be explained hereinafter. The lug 16 is provided with a bearing seat 18 against which one end of an adjustable anchor rod 19 is threadably mounted in an enlarged ear 20 projecting from one end of a servo mechanism housing 21. By threading the anchor rod 19 toward the lug 14 the brake band 12 may be made to fit more closely around the brake drum 11, or vice-versa, by threading the anchor rod 19 away from the lug 14 the brake band 12 may be loosened. A locknut 22 is threaded on the anchor rod 19 and arranged for engagement with one end of the boss or ear 20 so as to provide a means for maintaining the selected adjusted position of the anchor rod 19.

One end of the servo mechanism housing 21 is fastened to the transmission casing 23 by means of attaching bolts 24 (only one of which is shown in Figure 1). Extending from the opposite end of the servo mechanism housing 21 is an arm 25 which may be integrally formed with or rigidly fixed to the housing. The free end of the arm 25 is apertured for receiving attaching bolts 26 (only one of which is shown in Figure 1) which are threaded into threaded recesses formed in the transmission casing 23.

The arm 25 carries a pin 27 which serves as a bearing for pivotally mounting a lever arm 28 thereon. Suitable anti-friction bearing means 29 are employed between the pivot pin or shaft 27 and the thrust lever arm 28 to reduce friction therebetween. One end of the lever arm is provided with a pocket 30 for receiving one end of a strut 31. The opposite end of the strut 31 is received and abuts a bearing seat 32 formed in the anchor lug 14. From the foregoing it will be appreciated that counter-clockwise movement of the lever arm 28, as viewed in Figure 1, will move the strut 31 to the left and will cause the brake band 12 to contract and engage the brake drum 11 to effect a braking action on the ring gear 10. The servo mechanism housing 21 of the servo mechanism, designated generally by the numeral 33, is in the form of a cylinder closed at one end by a wall 34. A section 35 of the interior wall surface adjacent the end wall 34 is of a smaller internal diameter than the wall section 36 extending from such reduced diameter wall section to the open end of the housing whereby an annular shoulder 37 is provided. A pair of cup-shaped members 38 and 39 are positioned within the housing 21 and are arranged end to end. The innermost member 38 has one end thereof abutting the annular shoulder 37. An annular radially extending flange 40 of a spring retainer 41 abuts the outermost end of the member 39 and the members 38, 39 and the spring retainer 41 are held immovable with respect to the housing 21 by means of a snap ring 42 which is adapted to be expanded in an internal groove 43 formed in the wall section 36 adjacent the outermost end thereof and adapted to abut the radially extending flange 40. The cup-shaped member 38 includes a radially extending wall portion 44 and an annular axially extending section 45 integrally formed therewith and adapted to slidingly engage the interior of a portion of wall section 36 as pointed out hereinbefore. The cup-shaped member 39 also has a radially extending wall portion 46 and an integrally formed annular axially extending wall portion 47. The radially extending wall portions 44 and 46 lie in planes which are axially spaced from each other and the end wall 34 of the housing 21 and such planes are substantially parallel with respect to each other and the end wall 34. The radially extending walls 44 and 46 are provided with central circular openings therethrough for slidably receiving a piston rod 48. The innermost end of the piston rod 48 has a piston plate 49 secured thereto. The periphery of the piston plate 49 slidingly engages the interior of wall section 35 and is adapted to move axially between the end wall 34 of the housing 21 and the radially extending wall 44. A second piston plate 50 is fastened to the piston rod 48 at a point axially spaced from the piston plate 49. The periphery of the piston plate 50 slidingly engages the interior wall surface of the axially extending section 45 of the cup-shaped member 38. A third piston plate 51 axially spaced intermediate the piston plate 50 and the end of the piston rod 48 remote from the innermost end thereof is similarly fixed to the piston rod 48. The peripheral edge of the piston plate 51 slidingly engages the inner surface of the axially extending section 47. From the foregoing it will be appreciated that a compound piston is provided which includes piston plates 49, 50 and 51. The piston plates 49, 50 and 51 move in unison with the piston rod 48. The piston plate 49 is disposed within a chamber 52 defined by the end wall 34 of the housing 21, the interior surface of reduced diameter wall section 35 and the radially extending wall 44. In a similar manner the piston plate 50 is contained within a chamber 53 which is defined by the radially extending walls 44 and 46 and the interior surface of the axially extending wall portion 45 of the cup-shaped member 38. A third chamber 54 in which the piston plate 51 is disposed is defined by the radially extending wall 46 and the axial wall portion 47 of the cup-shaped member 39.

A helical wound compression spring 55 encircles the piston rod 48 and has one end abutting the bottom of the retainer 41 and its opposite end engaging a flange 56 formed on a filter screen element 57. An axially extending annular flange 58 of the filter screen element 57 embraces the piston rod 48. As the piston rod 48 moves to the right, as viewed in Figure 1, the filter screen element 57 moves with it against the yieldable resistance of the spring 55. The outer terminal end of the piston rod 48 is provided with a semi-spherical bearing seat 59 against which one end of a thrust link 60 abuts. The opposite end of the thrust link 60 bears against a similar bearing seat 61 formed in one end of the lever arm 28.

From the foregoing it will be appreciated that admission of fluid under pressure of sufficient magnitude in chambers 52, 53 and 54 on the left or working surface of the piston plates 49, 50 and 51, as viewed in Figure 1, will effect movement of the piston rod 48 to the right and rock the lever arm 28 in a counter-clockwise direction about the pin 27. Counter-clockwise movement of the lever arm 28 from the position shown in Figure 1 will in turn, through the intermediary of the thrust strut 31, cause the brake band 12 to contract about the brake drum 11 to effect a braking action on the ring gear 10. Upon release of the pressurized fluid in the chambers 52, 53 and 54 the compression spring 55 will move the piston rod 48 to the left, as viewed in Figure 1, and relieve the brake-applying force acting upon the lever arm 28 tending to rock the same in a counter-clockwise direction. Once the brake applying force has been reduced sufficiently the brake band expanding spring 17 in conjunction with the inherent resiliency of the brake band 12 to expand effects disengagement of the brake band 12 with the brake drum 11.

As stated hereinbefore, the servo mechanism 33 is designed to afford automatically the proper maximum brake-applying force required during each of the three operational phases and the transition rate at which such maximum force is reached during each of the three operational phases of the servo mechanism. It is believed clear that the maximum force required in the first or slack-takeup phase of the brake engaging cycle need be only great enough to move the brake band 12 to a position where it initially engages the clutch drum 11 and to obtain this movement it is only necessary to compress the springs 55 and 17 and overcome the inherent resilience of the brake band 12 itself. Obviously the maximum force required in the second or brake applying phase must be greater than the maximum force required in the first slack takeup phase and the rate of which the brake applying force changes from the maximum force of the first phase to the maximum force of the second phase must be great enough to insure a relatively fast application of the brake but must not be too great whereby the brake is suddenly applied causing the various components of the brake mechanism to be overstressed and perhaps damaged. The same reasoning is true with regard to the transition rate between the maximum force desirable in the second operational phase and the maximum operational force of the third or brake-holding operational phase of the servo-mechanism. In order to automatically provide the proper maximum brake applying force to the lever arm 28 and to control the rate at which the brake applying force changes between each operational phase, control valve means, designated generally by numeral 62, is employed. Control valve means 62 includes a spool-type valve member 63 which is slidably mounted in a bore 65 formed in the piston rod 48. The bore 65 is closed at one end by a flat surface 66 and has its other opposite end in fluid communication with the chamber 52. The interior wall surface 67 of the piston rod 48 defining cylindrical bore 65 is provided with an annular groove 68 adjacent the open end of the bore into which a semi-circular portion 69 of a spring clip is expanded. The spring clip 70 includes a U-shaped portion 71 which extends toward the flat surface 66 from the semi-circular portion 69. The bight 72 of the U-shaped portions 71 lies in a plane substantially perpendicular to the longitudinal axis of the bore 65. The bight 72 serves as a stop for limiting sliding movement of the valve member 63 to the left as viewed in Figure 1 or toward the open end of the bore 65. A helical wound compression spring 73 is also disposed within the bore 65 and has one end abutting the flat surface 66 and its opposite end engaging one end of the spool-type valve 63 whereby the valve member 63 is yieldably urged to the left into engagement with the bight 72 of the spring clip 70. From the foregoing it will be appreciated that the valve member 63 moves with the piston rod 48 and it is also movable relative to the piston rod 48. The effect of such relative movement on the operation of the servo-mechanism will be pointed out hereinafter.

The control valve member 63 is shown disassembled from the servo-mechanism 33 in Figure 6. The control valve member 63 is generally cylindrical in shape and is provided with an annular land 74 on one end thereof and a similar land 75 on the opposite end thereof. The enlarged central section 76 of the valve member 63 has an axial length considerably greater than the axial length of the land 74, 75 and has its opposite ends fixed to the land 74 and 75 by means of integrally formed reduced diameter sections or spindles 77 and 78, respectively. It will be appreciated that the land 74, reduced diameter section 77 and one end of the central section 76 outline an annular space 79 and similarly the land 75, reduced diameter section 78 and the opposite end of the central section 76 outline an annular space 80 axially spaced from the annular space 79. A central bore 81 (as shown in Figure 5) extends from one end of the valve member 63 and terminates at a point axially spaced from the end of the central section adjacent to the land 74. A bore 82 in axial alignment with the bore 81 extends from the opposite end of the valve member 63 and terminates at a point axially spaced intermediate the ends of the central section 76 adjacent the land 75 and the inner termination point of the bore 81. Extending radially in opposite direction from the innermost end of the bore 81 are ducts 83 which communicate with one end of a respective axially extending slot 84. The slots 84 are formed in the outer surface of the central section 76 and open into the annular space 80. A pair of oppositely extending radial ducts 85 open into the innermost end of the central bore 82 and a respective axial extending slot 86. From the foregoing it will be appreciated that the space within the piston rod 48 adjacent the land 74 is continually in communication with the annular space 80 and similarly the space within the piston rod 48 adjacent the land 75 of the valve member 63 is continually in communication with the annular space 79. However, the annular spaces 79 and 80 are not in communication with each other.

Referring to Figure 1 it will be noted that the piston rod 48 is provided with a plurality of circumferentially spaced radially extending ports 87 therethrough which are adjacent the wall portion 44. With the brake structure in its brake released position, control valve member 63 is in the position shown in Figure 1. It will be noted that in this position, because the axial length of the land 74 is substantially equal to the axial spacing between the bight 72 of the spring clip 70 and the ports 87, the chamber 53 is in fluid communication with the annular space 79 but is not in fluid communication with the chamber 52. A second series of circumferentially spaced, radially extending ports 88 are provided through the piston rod 48 adjacent the piston plate 51. When the control valve member 63 is in the position corresponding to the brake fully released position, chambers 53 and 54 are in fluid communication by virtue of ports or ducts 87, 88, annular space 79, ducts 85, and slots 86. The piston rod 48 is also provided with a third series of circumferentially spaced, radially extending outlet ports 89 therethrough adjacent to the filter screen 57 which opens into the space enclosed by the filter screen 57 and the piston plate 51. It will be appreciated that the piston rod 48 serves as a valve body of the control valve means 63.

In operation, assuming that the brake mechanism is in its fully released position with the brake band 12 disengaged from the brake drum 11 and the servo mechanism 33 components in the position shown in Figure 1 pressurized fluid is admitted to the chamber 52 by way of a pipe 90. Pipe 90 has one end provided with a pipe fitting which is threaded into a recess 91 extending through the end wall 34 of the housing 21. The pipe 90 leads to an oil pump (not shown). Interposed between the oil pump and the end of the pipe 90 attached to the end wall 34 is a two-way valve 92, shown somewhat diagrammatically in Figures 4 and 5. The valve 92 when in one condition of operation permits pressurized fluid to flow from the oil pump to chamber 52 and in its second condition of operation disrupts the flow of pressurized fluid from the pump and places the chamber 52 in fluid communication with an oil sump defined by a sheet metal cup-shaped member 93 which is suitably fastened to the bottom of the transmission casing 23 by means of a plurality of bolts 94. It is to be understood, in use, the servo mechanism 33 is substantially submerged in oil contained within the oil sump and the oil pump suction line is disposed in the bottom of the sump. A removable drain plug 95 is provided in the bottom of the sump for draining the sump of oil.

Figure 2 illustrates the relative positions of the various components of the servo mechanism 33 when the brake mechanism is in its fully released position. It will be noted that the valve member 63 is yieldably urged into engagement with the bight 72 of the spring clip 70 by the valve spring 73 and the servo return spring 55 yieldably forces the piston plates 49, 50 and 51 into abutting engagement with raised annular bosses 96, 97 and 98 respectively formed on the end wall 34, wall portion 44 and wall portion 46 respectively. It will also be noted that an aperture or port 99 is formed through the servo housing 21 adjacent the wall portion 44. The port 99 is provided to prevent hydraulic lock of the piston plate 49. In other words, the port 99 permits the escape of air or fluid trapped between the piston plate 49 and the wall portion 44 when the piston plate is moved to the right as viewed in Figure 5 and also to permit air or fluid from the sump to enter the space between the piston plate 49 and the wall portion 44 when the piston plate 49 is moved to the left. A similar port 100 is provided in the servo housing 21 adjacent the wall portion 46. A port is not required to prevent hydraulic lock of the piston plate 51 since the piston plate 51 is continuously in communication with the oil within the sump. From the foregoing it will be appreciated that with the brake mechanism in its fully released position and the valve 92 conditioned such that the chamber 52 is in communication with the sump, both sides of the piston plates 49, 50 and 51 are subjected to the same pressure or, in other words, the pressure existing on both sides of the piston plates is equalized. This condition of the servo mechanism 33 is graphically illustrated in Figures 7, 8 and 9 by numeral 101. In Figure 7 the pressure existing in chamber 52 is plotted against the displacement of the piston rod 48 whereas in Figure 8 the brake applying force exerted by the piston rod 48 is plotted against time and Figure 9 graphically illustrates the brake applying force exerted by the piston rod 48 in relation to the displacement of the piston rod 48. Thus, in Figure 7 the pressure existing in chamber 52 is zero with the at-rest position of the piston rod 48 and similarly in Figures 8 and 9 the brake applying force exerted by the piston rod 48 is zero when the brake mechanism is in its fully released position. To apply the brake mechanism the valve 92 is conditioned to permit pressurized fluid to flow from the oil sump through conduit 90 to the first chamber 52. The build-up of pressure within chamber 52 is relatively fast since only chamber 52 must be filled with pressurized fluid since chambers 53 and 54 are not in communication with chamber 52 at this point in the operational sequence of the servo mechanism. The pressurized fluid acting solely upon the piston plate 49 effects the initial slack-take-up movement of the piston rod 48 to the right as viewed in Figure 2 to the position shown in Figure 1. The pressurized fluid in chamber 52 is prevented from entering the chambers 53 and 54 because of the position of the control valve member 63 with reference to the ports 87 and 88. As indicated on the chart shown in Figure 7 wherein the pressure in the chamber 52 is plotted against the displacement of the piston rod 48 the pressure of the fluid in chamber 52 rises rapidly with very little displacement of the piston rod 48 initially. This is due to the fact that the clearance space between the piston plate 49 and the end wall 34 must first be filled with pressurized fluid. It will be appreciated that the pressure build-up within the chamber 52 is relatively rapid and the slack take-up in the brake mechanism thus begins almost immediately when the valve 92 is conditioned to permit pressurized fluid to flow from the oil pump to the chamber 52. The rapid pressure build-up occurs because chambers 53 and 54 are not in fluid communication with the chamber 52 and, consequently, it is not necessary to fill the clearance spaces associated with these chambers. As an example, in prior servos employing a single piston having an area equal to the areas of piston plate 49, 50 and 51 the pressure build-up would be considerably slower because the clearance volume would be approximately three times larger than the clearance volume of chamber 52. Once the initial sudden pressure build-up occurs the pressure rise within the chamber 52 is gradual for a relatively large part of the total displacement of the piston rod 48. However, the pressure while being sufficient to take up the slack in the brake mechanism and to overcome the resilient action of the springs 55 and 17 and the resilient tendency of the brake band 12 to expand is considerably less than the designed maximum pressure which is illustrated by a broken horizontal line 102 in Figure 7. During the latter part of the slack take up phase of operation of the servo mechanism 33 the pressure of the fluid within the chamber 52 acting upon the end of the valve member 63 is sufficient to cause the valve member to start moving to the right relatively to the piston rod 48 against the resilient action of the control valve spring 73. That point is illustrated in Figures 7, 8 and 9 by numeral 103. Figure 1 illustrates the position of the valve member 63 in relation to the piston rod 48 just prior to the establishment of sufficient fluid pressure within the chamber 52 to cause compression of the spring 73. Once the control valve member 63 has moved a sufficient distance relatively to the piston rod 48 away from the bight 72 whereby the land 74 partially uncovers the port 87, fluid under pressure from the chamber 52 is bled into the chamber 53. Point 104 on the curves shown in Figures 7, 8 and 9 represents the point where the land 74 has completely uncovered the port 87 as shown in Figure 3. That portion of the curve between points 103 and 104 in Figure 7 is substantially horizontal or, in other words, the fluid pressure in chamber 52 is substantially constant for a relatively short distance of the total travel of the piston rod 48. This is due to the fact that an additional volume, namely chamber 53, is placed in communication with the chamber 52. However, referring to Figure 9 wherein the brake applying force is plotted against displacement, the force increases considerably between points 103 and 104 because an additional piston plate area, namely plate 50, is subjected to fluid under pressure. In other words the force being dependent upon the area of the piston and the fluid pressure acting upon the piston rises rapidly since the piston area is substantially double although the fluid pressure remains substantially constant.

Figure 3 illustrates the relative positions of the valve member 63 and piston rod 48 with respect to the servo housing 21 corresponding to point 104 on the curves of Figures 7, 8 and 9.

Point 104 on the chart also represents the start of the second operational or brake-engaging phase of the servo mechanism 33 which ends at approximately a point designated by numeral 105 on the charts. At point 105 the control valve member 63 has moved to a position where the land 75 begins to uncover the port 88. Pressurized fluid then flows from the annular space 80 to the third chamber 54. The pressure of the fluid in chamber 52 remains substantially constant as evidenced by the horizontal portion extending between point 105 and a point 106 in the chart shown in Figure 7, because of the additional clearance volume of chamber 54 and because of the fact that the valve member 63 is continually moving to the right to compress the valve spring 73. Point 106 on the chart also represents the point where the land 75 has completely uncovered the ports 88 and the areas of all of the piston plates 49, 50 and 51 is then subjected to pressurized fluid. The pressure build-up from point 106 to the maximum line pressure, indicated by broken line 102, is relatively rapid as evidenced by the slope of the curve as shown in Figure 7. Figure 4 illustrates the positions of the various components of the servo mechanism 33 at the end of the third or brake holding operational phase of the servo mechanism. From the foregoing it will be appreciated that the maximum pressure experienced at each of the three operational phases and the rate of pressure build-up in each of the three operational phases is controlled. The significance of such control is believed apparent but will be pointed out hereinafter.

As stated hereinbefore an object of the invention is to provide a servo mechanism wherein the pressurized fluid is quickly drained therefrom upon dis-establishment of the source of fluid pressure whereby the brake mechanism is rapidly released. This is accomplished in the following manner. Assuming that the various components of the servo mechanism 33 are in position as shown in Figure 4 which corresponds to the brake fully applied position, conditioning of the valve 92 such that conduit 90 leading from the chamber 52 is placed in communication with the sump instead of the oil pump permits oil to flow from chamber 52 directly to the sump. When this occurs the pressure in chamber 52 decreases, the rate of such decrease in pressure is dependent upon the area of the conduit 90. As the pressure falls a certain amount the valve spring 73, which is continually urging the control member 63 to the left as viewed in Figure 4, moves the control member 63 to a position wherein the land 75 is to the left of the ports 88. When this occurs it will be appreciated that chamber 54 is in communication with the drain ports 89 as shown in Figure 5. As the pressure within chamber 52 further decreases the valve member 63 moves further to the left until ports 87 are in communication with the annular space 79 as shown in Figure 1. As stated hereinbefore annular space 79 is continually in fluid communication with the central bore 82. Thus since the central bore 82 is in communication with the drain port 89 the fluid contained within chamber 53 can flow to the sump through drain ports 89. From the foregoing it will be apparent that all of the fluid entering the chambers 52, 53 and 54 flows through conduit 90 when the brake mechanism is being applied, but when the brake mechanism is released only the oil contained within chamber 52 is returned to the sump through conduits 90 whereas approximately two-thirds of the oil contained within the servo mechanism 33 when the brakes are in their fully applied position, namely, that contained in chambers 53 and 54 is drained directly to the sump.

Referring to Figures 8 and 10, the broken horizontal line indicated by numeral 107 represents the maximum brake applying force obtainable with the fluid pressure actuated device of the present invention and that obtainable with a conventional fluid actuated device, respectively. The maximum obtainable brake applying force is the same in both devices. However, as graphically illustrated, the time required to obtain the maximum brake applying force in the device of the present invention is less than that required in a conventional device of the type having a single piston of an effective area equal to the total effective areas of the piston plates 49, 50 and 51 and which single piston is subjected to the same pressure fluid as the piston plates 49, 50 and 51 are subjected to. It will thus be appreciated that the application of the brake mechanism will be much faster in installations employing the device of the present invention when compared with the brake application time required with prior devices. This is true because in the device of the present invention only one chamber 52 need be filled with fluid under pressure to take up the slack in the brake mechanism and consequently the brake slack take-up time is very small when compared with the time required to take up the slack in the prior art devices which, obviously, require the single cylinder being substantially filled with fluid under pressure before the slack will be completely taken up. In conventional devices, as graphically illustrated in Figure 10, a good portion of the time required to apply the brake mechanism is consumed in taking up the slack because of the relatively long time to fill the single cylinder with fluid under sufficient pressure which reacts against the single piston to develop the necessary force to overcome the slack in the brake mechanism. In other words, the volume of fluid required in the device of the present invention to take up the slack in the brake mechanism is considerably smaller than that which must be introduced into the single cylinder of conventional devices in order to take up the slack in the brake mechanism. Consequently, with a given size inlet opening and line pressure the slack take-up time is much shorter than in conventional devices. Furthermore, as evidenced by comparison of the chart shown in Figures 8 and 10, the maximum force applied to the brake mechanism is reached in a series of progressive steps rather than suddenly. Thus, the application of the brake mechanism is much softer and severe shock forces to the mechanism is mitigated. As illustrated in Figure 10, the rapid pressure rise in conventional devices imposes a severe strain on the brake applying mechanism.

The embodiment of the invention chosen for purposes of description and illustration herein is that preferred for achieving the objects of the invention and developing the utility thereof in the most desirable manner, due regard being had to existing factors of economy, simplicity of design and construction, and the improvements sought to be effected. It would be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A servo-motor for effecting frictional engagement of relatively movable members including first, second and third piston chambers arranged end-to-end; a piston rod extending axially through said piston chambers, said piston rod having a central axially extending bore having one end in fluid communication with a fluid sump and having its opposite end in fluid communication with said first piston chamber; first radially extending duct means in said piston rod for providing fluid communication between said second piston chamber and the interior of said piston rod; second radially extending duct means axially spaced from said first duct means in said piston rod for providing fluid communication between said third chamber and the interior of said piston rod; a piston disposed in each of said chambers fixedly secured to said piston rod whereby said pistons slide in unison with respect to said chambers; a conduit opening into said first chamber, said conduit being alternatively conditional to be placed in fluid communication with a fluid sump and to be placed in fluid communication with a source of fluid under pressure to supply said first chamber with fluid under pressure; and control valve means disposed within said central bore of said piston rod, said control valve means including a control valve member slidably mounted within said central bore between a first position wherein said first and second duct means are in fluid communication with the end of said bore in fluid communication with a fluid sump, a second position wherein said first duct means is in fluid communication with the end of said central bore in fluid communication with said first chamber and said second duct means is in fluid communication with a fluid sump, and a third position wherein said first and second duct means are in fluid communication with said end of said central bore in fluid communication with said first chamber, and spring means within said central bore for biasing said control valve member to its first position.

2. A servo-motor substantially as set forth in claim 1, including an abutment stop within said central bore of said piston rod adapted to be engaged by said control valve member to limit sliding movement thereof in one direction to establish the first position of said control valve member.

3. A servo-motor for effecting frictional engagement of relatively movable members including a plurality of piston chambers arranged end-to-end; a piston rod extending axially through said piston chambers, said piston rod having a central axially extending bore closed at one end and having its opposite end opening into one of said piston chambers; a piston disposed in each of said chambers fixedly secured to said piston rod whereby said pistons slide in unison with respect to said chambers; a conduit opening into said one of said chambers, said conduit being alternatively conditionable to be placed in fluid communication with a fluid sump and to be placed in fluid communication with a source of fluid under pressure to supply said one of said chambers with fluid under pressure; a control valve member slidably mounted within said central bore with said piston rod, said control valve member being slidable between a first position wherein fluid communication between said chambers and said one of chambers is precluded, a second position wherein fluid communication between one of said chambers and said one of said chambers is established and fluid communication between the remainder of said chambers and said one of said chambers having said conduit opening thereinto is precluded, and a third position wherein all of said chambers are in fluid communication with said one of said chambers having said conduit opening thereinto; and yieldable means biasing said control valve member to its first position.

4. A servo-motor for effecting frictional engagement of relatively movable members including first, second and third chambers arranged end-to-end; a piston rod extending axially through said piston chambers, said piston rod having a central axially extending bore in fluid communication with said first piston chamber; first duct means extending through said piston rod for providing fluid communication between said bore and said second chamber; second duct means in said piston rod for providing fluid communication between said third chamber and said bore; and control valve means disposed within said central bore of said piston rod, said control valve means including a control valve member slidable in said bore between a first position wherein said first and second duct means are in fluid communication with the end of said central bore remote from said end in fluid communication with said first chamber, a second position wherein said first duct means is in fluid communication with said end of said central bore in fluid communication with said first chamber and said second duct means is in fluid communication with the opposite end of said central bore, and a third position wherein said first and second duct means are in fluid communication with said end of said central bore in fluid communication with said first chamber; and spring means yieldably urging said control valve member toward its first position.

5. A servo-motor substantially as set forth in claim 4, including an abutment stop carried by said piston rod within said central bore adjacent the end thereof in fluid communication with said first chamber engageable with said control valve member to limit axial movement thereof in one direction to establish the first position of said control valve.

6. A servo-motor for effecting frictional engagement of relatively movable members including a plurality of piston chambers arranged end-to-end; a piston rod extending axially through said piston chambers, said piston rod having a central axially extending bore closed at one end and having its opposite end opening into one of said piston chambers; a piston disposed in each of said chambers fixedly secured to said piston rod whereby said pistons slide in unison with respect to said chambers; a conduit opening into said one of said chambers, said conduit being alternatively conditionable to be placed in fluid communication with a fluid sump and to be placed in fluid communication with a source of fluid under pressure to supply said one of said chambers with fluid under pressure; and control valve means disposed within said central bore of said piston rod, said control valve means being responsive to a fluid pressure rise in said one of said chambers for sequentially establishing fluid communication between said one of said chambers and the other chambers, said control valve means being responsive to a fluid pressure decrease in said one of said chambers for sequentially establishing fluid communication between said other chambers and a fluid sump.

7. A servo-motor for effecting frictional engagement of relatively movable members including a plurality of piston chambers arranged end-to-end; a piston rod extending axially through said piston chambers; a piston disposed in each of said chambers fixedly secured to said piston rod whereby said pistons slide in unison with respect to said chambers; a conduit opening into one of said chambers, said conduit being alternatively conditionable to be placed in fluid communication with a fluid sump and to be placed in fluid communication with a source of fluid under pressure to supply said chamber with fluid under pressure; and control valve means carried by and within said piston rod responsive to a fluid pressure rise in said one chamber for sequentially establishing fluid communication between said one chamber and the other chambers, said means being responsive to a fluid pressure decrease in said one chamber for sequentially establishing fluid communication between said other chambers and a fluid sump.

References Cited in the file of this patent

UNITED STATES PATENTS

| | | |
|---|---|---|
| 285,883 | Fisher | Oct. 2, 1883 |
| 825,866 | Rogers | July 10, 1906 |
| 1,994,974 | Wiedmann | Mar. 19, 1935 |
| 2,374,011 | Gunderson | Apr. 17, 1945 |
| 2,394,655 | Better | Feb. 12, 1946 |
| 2,568,228 | Forse | Sept. 18, 1951 |
| 2,667,035 | Marsden | Jan. 26, 1954 |